US009420066B2

United States Patent
Dolin et al.

(10) Patent No.: US 9,420,066 B2
(45) Date of Patent: Aug. 16, 2016

(54) AUTOMATED CONTENT SUBMISSION TO A SHARE SITE

(71) Applicant: MICROSOFT CORPORATION, Redmond, WA (US)

(72) Inventors: Robert Michael Dolin, Seattle, WA (US); Douglas Ray Pearce, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 793 days.

(21) Appl. No.: 13/729,972

(22) Filed: Dec. 28, 2012

(65) Prior Publication Data

US 2013/0117361 A1 May 9, 2013

Related U.S. Application Data

(63) Continuation of application No. 12/473,487, filed on May 28, 2009, now Pat. No. 8,359,544.

(51) Int. Cl.
*G06F 3/048* (2013.01)
*H04L 29/06* (2006.01)
*G06F 17/30* (2006.01)

(52) U.S. Cl.
CPC ............ *H04L 67/42* (2013.01); *G06F 17/3089* (2013.01)

(58) Field of Classification Search
CPC .................................................. G06F 17/30899
See application file for complete search history.

(56) References Cited

U.S. PATENT DOCUMENTS

| 6,958,749 | B1 * | 10/2005 | Matsushita | G06F 3/0416 178/18.03 |
| 7,529,766 | B2 * | 5/2009 | Shilo | G06Q 30/02 |
| 2001/0029527 | A1 * | 10/2001 | Goshen | G06F 17/30899 709/218 |
| 2004/0024635 | A1 * | 2/2004 | McClure | G07C 13/00 705/12 |
| 2004/0061720 | A1 * | 4/2004 | Weber | G06F 17/30899 715/760 |

(Continued)

FOREIGN PATENT DOCUMENTS

CN 1924907 3/2007

OTHER PUBLICATIONS

European Search Report dated Apr. 11, 2016 in Application No. 10781031.9, 7 pages.

*Primary Examiner* — Ryan Pitaro
(74) *Attorney, Agent, or Firm* — Jim Banowsky; Judy Yee; Micky Minhas

(57) ABSTRACT

Methods, systems, and computer-readable media for remotely submitting content to a website without navigating to the website are provided. The website is a content-sharing website that accepts public content submissions and makes the content available to multiple users. Initially, a client application may download remote-content-submission instructions from the website. Subsequently, the client application may follow the instructions to format a remote content submission and communicate it to the website.

20 Claims, 7 Drawing Sheets

(56) References Cited

U.S. PATENT DOCUMENTS

| | | | | |
|---|---|---|---|---|
| 2005/0262437 A1* | 11/2005 | Patterson | ............... | G06F 17/243 715/243 |
| 2006/0101341 A1* | 5/2006 | Kelly | ................ | G06F 17/30899 715/738 |
| 2007/0157104 A1* | 7/2007 | Blain | ................. | G06F 3/04842 715/771 |
| 2007/0157118 A1* | 7/2007 | Wuttke | ................. | G06Q 10/10 715/810 |
| 2007/0277124 A1* | 11/2007 | Shin | .................... | G06F 3/04886 715/863 |
| 2008/0154949 A1 | 6/2008 | Brooks et al. | | |
| 2008/0155425 A1* | 6/2008 | Murthy | ................ | G06F 9/4443 715/738 |
| 2008/0294972 A1* | 11/2008 | Hjelte | ............... | G06F 17/30899 715/201 |
| 2008/0297485 A1* | 12/2008 | Park | ....................... | G06F 3/0482 345/173 |
| 2008/0307454 A1* | 12/2008 | Ahanger | ................ | G06Q 30/02 725/36 |
| 2009/0061835 A1* | 3/2009 | Schmidt | ................ | H04W 4/023 455/414.2 |
| 2009/0125511 A1* | 5/2009 | Kumar | .................. | G06Q 10/107 |
| 2009/0177973 A1* | 7/2009 | Shilo | ...................... | G06Q 30/02 715/744 |
| 2009/0271283 A1* | 10/2009 | Fosnacht | ............ | G06Q 20/123 705/26.1 |
| 2009/0281905 A1* | 11/2009 | Walton | ................... | G06Q 10/06 705/26.1 |
| 2010/0005068 A1* | 1/2010 | Howard | .................. | G06T 11/60 707/E17.108 |
| 2010/0198742 A1* | 8/2010 | Chang | .................... | G06Q 10/00 705/319 |
| 2011/0010357 A1* | 1/2011 | Kim | ...................... | G06F 17/30991 707/708 |
| 2011/0016427 A1* | 1/2011 | Douen | ................... | G09B 23/28 715/828 |
| 2011/0022966 A1* | 1/2011 | Rose | ................... | G06F 17/3089 715/747 |
| 2011/0099513 A1* | 4/2011 | Ameline | ............... | G06F 3/0488 715/790 |

* cited by examiner

AUTOMATED CONTENT SUBMISSION TO A SHARE SITE

CROSS-REFERENCE TO RELATED APPLICATIONS

This application is a continuation of, and claims priority from, U.S. patent application Ser. No. 12/473,487, filed May 28, 2009, entitled "AUTOMATED CONTENT SUBMISSION TO A SHARE SITE" which is herein incorporated by reference in its entirety.

BACKGROUND

Currently, content-sharing websites allow a user to submit content that may be shared with others through the content-sharing website. The content-sharing websites may rank the received contents based on the number of times the identical content is submitted to the website or by allowing users of the website to rank or rate the content. Some sites place content with the highest rankings on the front page for others to view. This allows other users to readily find content that is deemed interesting by the largest number of users. The content may include blog entries, news articles, pictures, videos, songs, status updates, user profiles, celebrity profiles, and other digital content. The content may actually be hosted by a separate website with only links to the content presented on the content-sharing website. Some content-providers, such as blogs and news magazines, allow a user to automatically submit content to one or more of a plurality of content-sharing websites from the content-provider's web site.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow a user of a client application, such as a web browser, to remotely submit content to one or more content-sharing websites. A content-sharing website is a website that receives content submissions from users and displays the submitted content according to popularity, or other criteria. The users may also be able to submit content ratings and commentary on the content to the content-sharing website. Embodiments of the present invention allow a user to navigate to a content-provider's website and submit content (e.g., a blog entry, an article, a video) to a designated content-sharing website without leaving the content-provider's website. Embodiments of the present invention allow the user to select one or more content-sharing websites to which the client application may submit content. The client application may need to access remote-submission instructions for a content-sharing website before the client application is able to remotely submit content to the content-sharing website.

BRIEF DESCRIPTION OF THE DRAWINGS

Embodiments of the invention are described in detail below with reference to the attached drawing figures, wherein.

DETAILED DESCRIPTION

Figure 1:
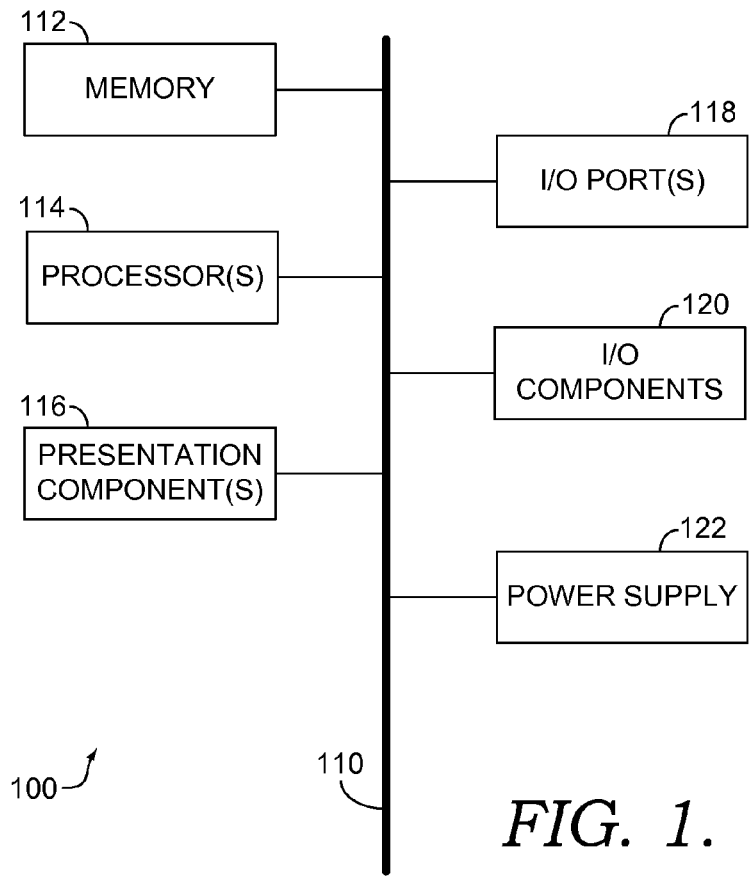
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow a user of a client application, such as a web browser, to remotely submit content to one or more content-sharing websites. A content-sharing website is a website that receives content submissions and content ratings from users and displays the submitted content according to popularity, or other criteria. Embodiments of the present invention allow a user to navigate to a content-provider's website and submit content (e.g., a blog entry, an article, a video) to a designated content-sharing website without leaving the content-provider's website. Embodiments of the present invention allow the user to select one or more content-sharing websites to which the client application may submit content. The client application may need to access remote-submission instructions for a content-sharing website before the client application is able to remotely submit content to the content-sharing website.

Accordingly, in one embodiment, one or more computer-readable media having computer-executable instructions embodied thereon for performing the method of remotely submitting content to a content-sharing website are provided. The method includes navigating to the content-sharing website, wherein the content-sharing website allows a user to submit content that may then be displayed to other users through the content-sharing website. The method also includes determining, at a client device, the content-sharing website has a remote content-reception functionality that allows the content-sharing website to remotely receive a content submission from an application operating on the client device. The method further includes displaying, through a user interface displayed on a display device communicatively coupled to the client device, a graphic indication that the content-sharing website is capable of remotely receiving the content submission from a remote-content-submission application on the client device that automatically submits content to the content-sharing website upon receiving a request from the user of the client device to generate the content submission. The method also includes receiving, at the client device, a request from the user of the client device to add the content-sharing web site to the remote-content-submission application. The method further includes retrieving, from a server hosting the content-sharing website, instructions for remotely submitting content to the content-sharing website. The method further includes, updating, at the client device, the remote-content-submission application based on the instructions, thereby enabling the remote-content-submission application to remotely submit content to the content-sharing website.

In another embodiment, a method of remotely submitting content to a content-sharing website through a client application. The method includes, receiving, through the client application operating on a computing device, a selection of content. The method also includes receiving, through the client application, a selection of one or more content-sharing websites to send the content. The content sharing websites display content from other sources that is submitted by users. The method also includes generating, for each of the one or more content-sharing websites, a content submission that conforms to instructions for remote submission to said each of the one or more content-sharing websites. The method further includes communicating to each of the one or more content-sharing websites the content submission that conforms to the instructions for remote submission to each of the one or more content-sharing websites.

In yet another embodiment, one or more computer-readable media having computer-executable instructions embodied thereon for performing a method of instructing a client device to automatically submit content to a content-sharing website are provided. The method includes receiving, at a server associated with a website, a request for the website, wherein the request is communicated from a client application operating on the client device and wherein the website is a content-sharing website. The method further includes communicating, from the server to the client device, the website. Code that is part of the content-sharing website includes an attribute that identifies the website as within a content-sharing-website category of websites and a location of an instruction for how a content submission should be communicated to the website. The instruction may be accessed by the client device upon receiving an indication that a user of the client device wishes to add the website to a remote-content-submission capability of the client application. The remote-content-submission capability automatically generates the content submission.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal digital assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
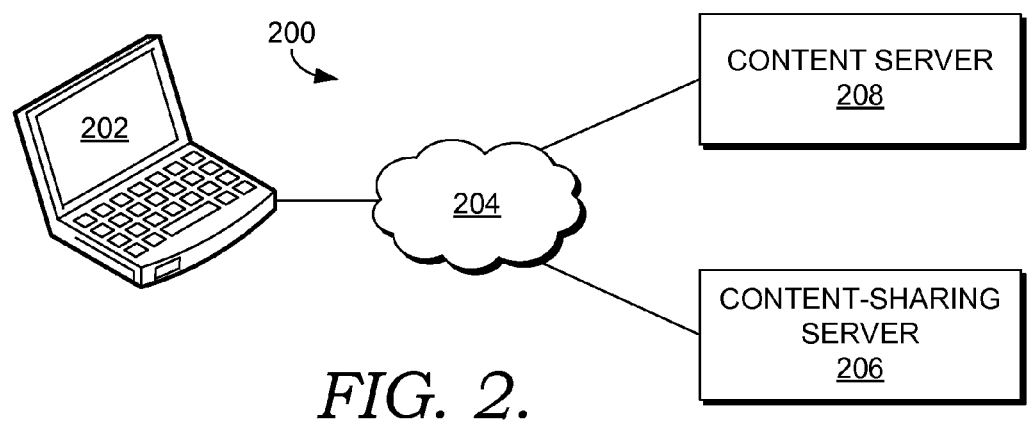
FIG. 2 is a block diagram of an illustrative operating environment suitable for implementing embodiments of the invention.

Turning now to FIG. 2, an illustrative operating environment 200 that contains a few of the components that may be used within embodiments of the present invention. The components shown in FIG. 2 are just some of the components that embodiments of the invention may interact with during operation. The components shown in FIG. 2 are described in brief, and with an emphasis on function for the sake of simplicity. The components within FIG. 2 are communicatively coupled to each other in a manner appropriate for carrying out their respective functions within the illustrative operating environment 200. Embodiments of the present invention are not limited by the communication protocols or formats used to facilitate communication between components; those mentioned are for the sake of enablement and not meant to be limiting.

Illustrative operating environment 200 includes a client device 202, a network 204, a content-sharing server 206, and a content server 208. Illustrative operating environment 200 is merely an example of one suitable environment and is not intended to suggest any limitation as to the scope of use or functionality of the present invention. Neither should illustrative operating environment 200 be interpreted as having any dependency or requirement related to any single component or combination of components illustrated therein. For example, the present invention could be practiced in an environment that includes a wireless network (not shown) that connects one or more devices, such as PDA's.

Client device 202 may be similar to the computing device 100 described with reference to FIG. 1. The client device 202 may run one or more applications that may access content over the Internet. The client device 202 may include a display device that is suitable for viewing media content such as movies, videos, video calls, pictures, websites, or television shows. An LCD screen is one example of a display device that might work with the client device 202.

The client device 202 may take on any of a variety of forms. By way of example, the client device 202 may be a mobile telephone, smart phone, pager, computing device, personal digital assistant ("PDA") or any combination of these or other devices. The client device 202 has the ability to present one or more forms of media content. Examples of media content that could be displayed include, TV shows, movies, videos, MP3 files, and radio programs. This list is not exhaustive. The media may be presented as it is received from the network 204 or from memory within the client device 202. The client device 202 may also be capable of receiving one or more forms of communication. Examples of communications that may be received include phone calls, video calls, text messages, multimedia messages, emails, calendar updates, and task reminders.

The network 204 is a wide area network ("WAN") and may include one or more mobile networks, one or more packet based networks, including the Internet, and the public switched telephone network ("PSTN"). The various components within the network 204 may be owned and/or operated by multiple entities, commercial or otherwise. The network 204 is configured to transmit a variety of communication formats including phone calls, emails, text messaging, faxes, instant messaging, pages, voice mails, photographs, audio files, movies, TV shows, calendar reminders, task reminders and other files containing communicative content.

The content-sharing server 206 is a computing device that may be similar to the computing device 100. The content-sharing server 206 may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 208 facilitates transmission of media content (e.g. websites, movies, videos, MP3's, etc.) to the client device 202. The content-sharing server 206 transmits the media content over the network 204. The content-sharing server 206 also hosts a particular kind of website that receives content (or links to content) and presents the content for groups of people to access. The content may be given a popularity rating based on the number of times the content is submitted and/or rated by other users. The content may be submitted by entering information in a user interface provided by the content-sharing server 206. Embodiments of the present invention allow the content-sharing server 206 to receive content remotely from an application operating on the client device 202. Embodiments of the present invention also allow the content-sharing server 206 to provide instruction for remote submission to the client application. Throughout this application actions performed by an application on the content-sharing server 206 may be described as being performed by the content-sharing server 206 without specifying the application that performed the action. The content-sharing server 206 may provide an access and authentication function in response to requests to access content or submit new content.

The content server 208 is a computing device that may be similar to the computing device 100. The content server 208 may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 208 facilitates transmission of media content (e.g. websites, movies, videos, MP3's, etc.) to the client device 202. The content server 208 transmits the media content over the network 204. The content server 208 may also host websites that are transmitted to a requesting computing device. The content server 208 may provide an access and authentication function in response to requests to access content on the content server 208.

Figure 3:
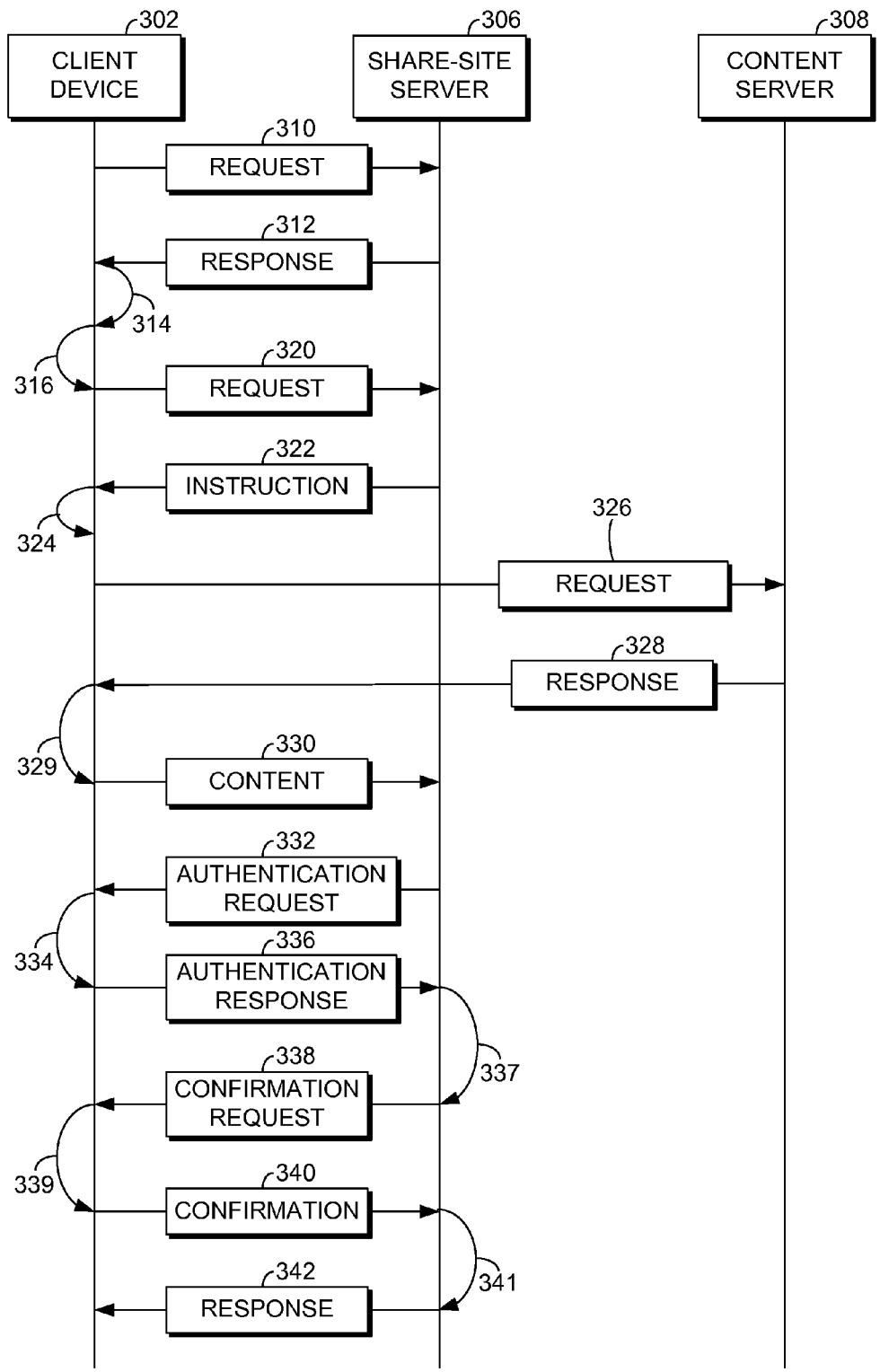
FIG. 3 is a diagram showing communications occurring during a remote content submission, in accordance with an embodiment of the present invention.

Turning now to FIG. 3, communications occurring during a remote content submission are shown, in accordance with an embodiment of the present invention. The communications occur between a client device 302, a share-site server 306 and a content server 308. The client device 302 may be similar to the client device 202 described previously with reference to FIG. 2. The share-site server 306 may be similar to the content-sharing server 206 described previously with reference to FIG. 2. The share-site server hosts a content-sharing website that is referred to as the share site or sharesite.com throughout this description. The share site is meant to be a specific example of a category of websites referred to as content-sharing websites. Examples of content-sharing websites include Digg, StumbleUpon, and Reddit. The content server 308 hosts a website that provides content to users. The content server 308 may be similar to the content sever 208 described previously with reference to FIG. 2.

Initially the user provides an instruction (not shown) to a client application to navigate to the share site. For example, the user may type a URL of the share site into the client applications navigation bar. Upon receiving an instruction to navigate to the share site hosted by the share-site server 306, the client device 302 sends a request 310 for the share site to the share-site server 306. In one embodiment, the request 310 is an HTTP Get request. Embodiments of the present invention are not limited to using the HTTP communication protocol. Other forms of communication may be utilized to communicate between components. In response to receiving the request 310, the share-site server 306 communicates a response 312 to the client device 302. The response 312 includes the content of the share-site. The response 312 may be in the form of an HTTP 200 OK response. The response 312 includes an indication that the share site hosted by the share site sever 306 is self identified as a content-sharing website. The self identification as a content-sharing website may be made by an attribute value communicated as part of the share site's web page.

Figure 4:
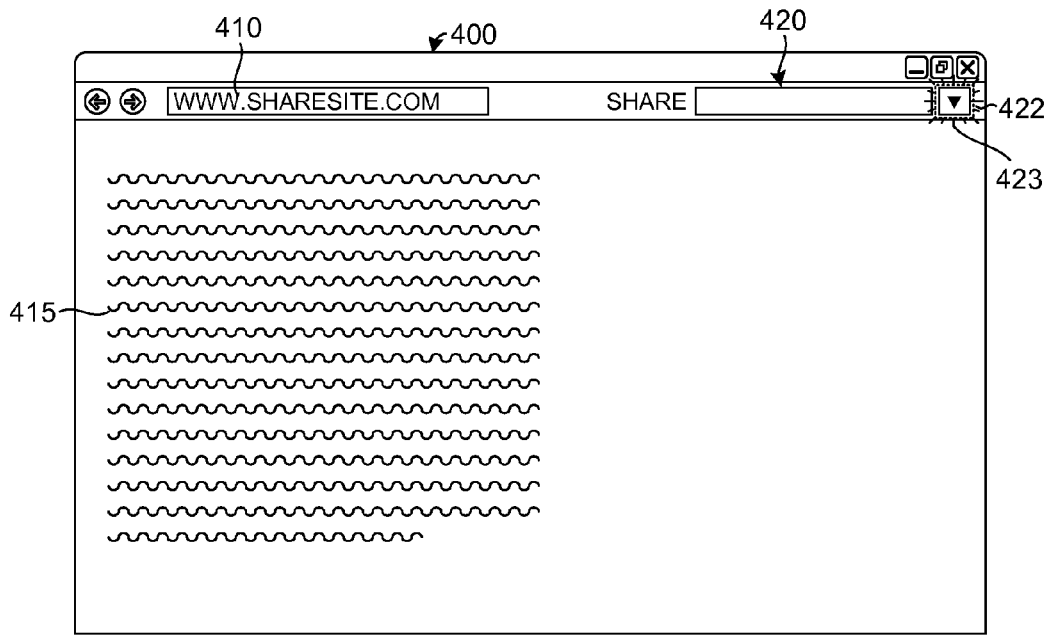
FIG. 4 is a diagram that shows a user interface generated by a client application that may be used to remotely submit content to the share site, in accordance with an embodiment of the present invention.

Upon receiving the response 312, the application running on the client device 302, which had initially requested the share site, determines that the share site is a content-sharing website with remote-content-reception capabilities. In response to determining that the share site has remote-content-reception capabilities, the client application displays 314 an indication that the user may enable the client application to remotely submit content to the share site. An example of such an indication is shown in FIG. 4. FIG. 4 shows a user interface 400 generated by a client application that may be used to remotely submit content to the share site, in accordance with an embodiment of the present invention. The user interface 400 is similar to a user interface generated by a web browser. The user interface 400 includes a navigation bar 410 showing the source of the content 415 displayed on the user interface 400. In this case an example content-sharing website "sharesite.com" is shown. The User interface 400 also includes a remote sharing interface 420 that allows a user to select one or more share sites to which content should be remotely submitted. The share sites that are currently enabled may be accessed by pushing input button 422. In FIG. 4, input button 422 is flashing as indicated by lines 423. The flashing indicates that the "sharesite.com" may be added as enabled for remote content submission. Other types of indications may be provided to the user such as changing the color or highlighting the remote content submission interface. The remote sharing interface 420 is part of the client application not the sharesite.com that is being displayed in the user interface 400. The content 415 may be series of links to content submitted by users of sharesite.com.

Returning now to FIG. 3, the user of client device 302 requests 316 that the share site be added to the remote-content-submission functionality of the client application. Once, the remote-content-submission functionality of the client application is enabled for the share site, the client application is able to submit content to the share site from other sources without navigating to the share site. Submitting content to a content-sharing website, like the share site, without navigating to the site is referred to as a remote-content submission. The request for instructions 320 is sent from the client device 302 to the share-site server 306. The request for instructions 320 may be addressed to a destination designated in metadata that is part of the original website downloaded in response 312. Upon receiving the request for instructions 320, the share-site server 306 communicates the remote submission instruction 322 to the client device 302. The remote submission instruction 322 may include the URL of the share site to which content submissions are addressed, an attribute for a URL of the content, an attribute for a description of the content, instructions to authenticate the user submitting the content, as well as other instructions necessary to receive the remote content submission or customize the display of the content. Upon receiving the remote submission instruction 322, the client application on the client device 302 may update 324 the user interface to indicate that remote content submission has been enabled for client application to send content to the share site.

Figure 5:
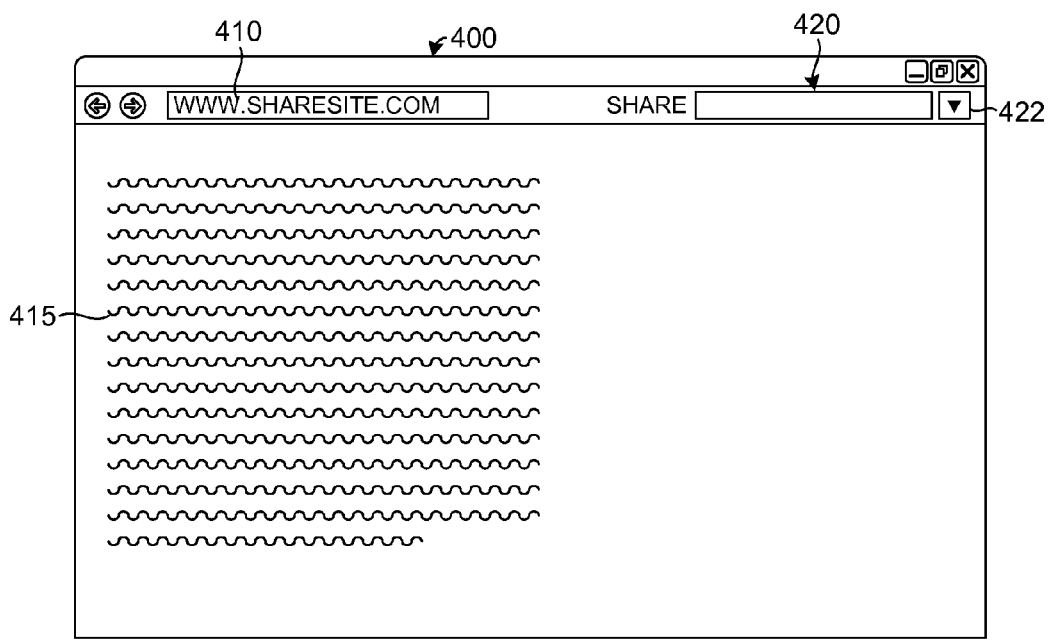
FIG. 5 is a diagram showing a user interface that has been updated to indicate that a client application has been enabled to remotely submit content to a content-sharing website, in accordance with an embodiment of the present invention.

FIG. 5 shows a user interface 400 that has been updated to indicate that a client application has been enabled to remotely submit content to a content-sharing website, in accordance with an embodiment of the present invention. The user interface 400 in FIG. 5 is identical to the user interface described previously with reference to FIG. 4 with a single exception that the input button 422 is no longer flashing. As described previously, the flashing indicates that client application may be enabled to remotely share content with the share site. The lack of flashing indicates that the share site has already been added. It should also be noted that the input button may not flash when the website is not identified as a share site in the first place. Thus, in one embodiment, the indication 423 is only provided when a share site is identified as a share site that is not already enabled for remote content submission.

Returning now to FIG. 3, the communications in FIG. 3 illustrate two separate series of communications that may occur as part of embodiments of the present invention. The first series of communications starting with request 310 and ending with update 324 enable a client application to remotely submit content to the share site. During the first series the client application requests and receives instructions to remotely submit content to the share site. During the second series of communications the client application follows the instructions to remotely submit content to the share site. There may be a significant time gap between the first series of communications and the second series of communications.

Figure 6:
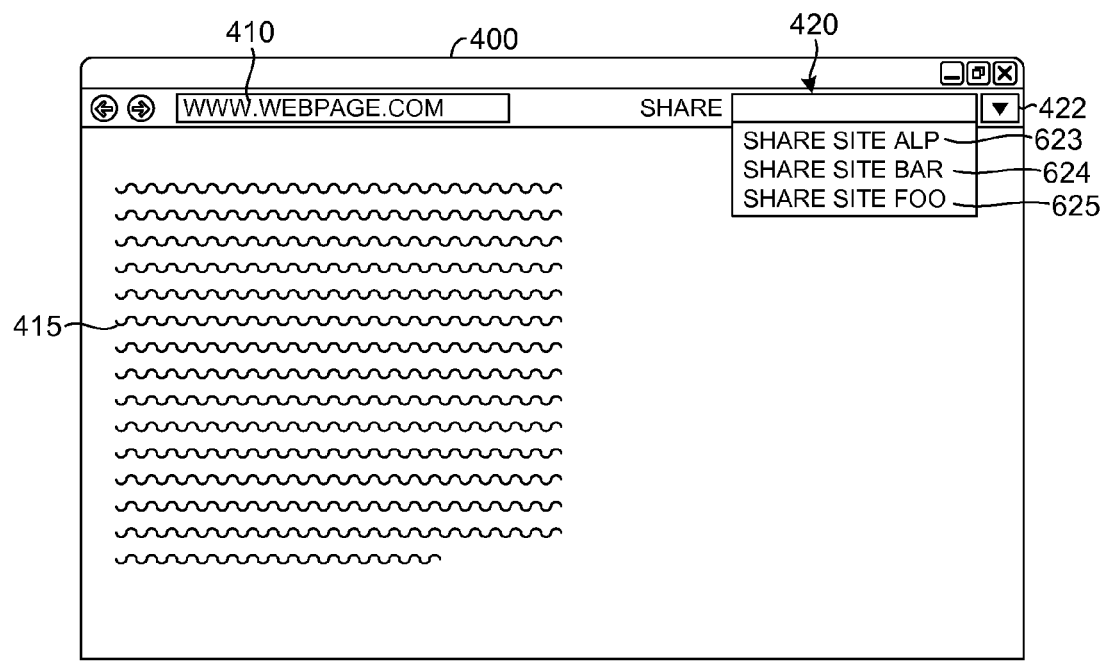
FIG. 6 is a diagram showing a user interface during remote submission of content to the share site, in accordance with an embodiment of the present invention.

The second series of communications start when the client application requests 326 a content website hosted by the content server 308. In response to the request 326, the website is sent to the client device 302 in response 328. The client application may then render and display the website to the user. The user instructs 329 the client application to generate a content submission to the share site. FIG. 6 shows a user interface during remote submission of content to the share site, in accordance with an embodiment of the present invention. Upon selection of the input button 422, multiple content-sharing websites that are enabled for remote content submission are shown in a dropdown menu. The dropdown menu includes share site alp 623, share site bar 624, and share site foo 625. These three share sites may have been selected for enablement previously by the user through the process described previously with reference to the first series of communications in FIG. 3. In the alternative, one or more of the share sites may have been pre-enabled by a supplier of the client application that generates user interface 400. The user selects one or more of the content-sharing websites. In one embodiment, the content submission is based on the URL in the navigation bar 410 when the content-sharing site is selected.

Continuing now with FIG. 3, the user instruction 329 may include a selection of content and a designation of one or more content-sharing websites to which the content should be sent. In the present embodiment, the selection of a single content-sharing website is shown for the sake of simplicity. The content submission may designate a portion of content from the website, such as an article or blog entry, or be the entire website. The content submission 330 is generated and transmitted to the share-site server 306. The content submission 330 will conform to the remote submission instructions 322 previously received from the share site. In one embodiment, sending the content submission 330 may conclude the content submission process. In other embodiments, a confirmation or authentication request may be sent back to the client device 302 before the content submission is accepted by the share-site server 306. These communications are illustrated in FIG. 3 but are not required in all embodiments of the present invention.

In the embodiment shown in FIG. 3, a submission of content to the share site requires authentication. Thus, in response to the content submission 330 the share-site server 306 generates an authentication request 332. The authentication request 332 may conform to basic HTTP authentication. In response to the authentication request 332, the client application may display an interface into which the user submits a password and perhaps a user name. In another embodiment, the client device retrieves 334 authentication information for the user from a storage location. Regardless of how the authentication information is retrieved 334, an authentication response 336 is generated and transmitted to the share-site server 306. Upon receipt of the authentication response 336, the share-site server 306 authenticates 337 the content submission 330.

In a further alternate embodiment of the present invention, the share-site server 306 seeks confirmation that the user intends to submit the content. The confirmation may be in addition to or instead of the authentication process. To initiate the confirmation, the share-site server 306 sends a confirmation request 338 to the client device 302. Upon receiving the confirmation request 338, the client device 302 displays a confirmation interface to the user. The confirmation interface may ask the user to confirm that they would like to submit the content that is part of the content submission 330. In one embodiment, the submitted content is shown as part of the confirmation interface. This may allow the user to correct a mistake, such as inadvertently sending personal information that the user did not wish to send. Upon receiving a user confirmation 339, a confirmation message 340 is sent to the share-site server 306. Upon receipt of the confirmation message 340, the share-site server 306 stores 341 the content. The content may be displayed as part of the content-sharing website. The share-site server 306 may then send a response 342 to the client device 302 indicating that a confirmation has been received. The response 342 may also serve the purpose of terminating the communication session.

Figure 7:
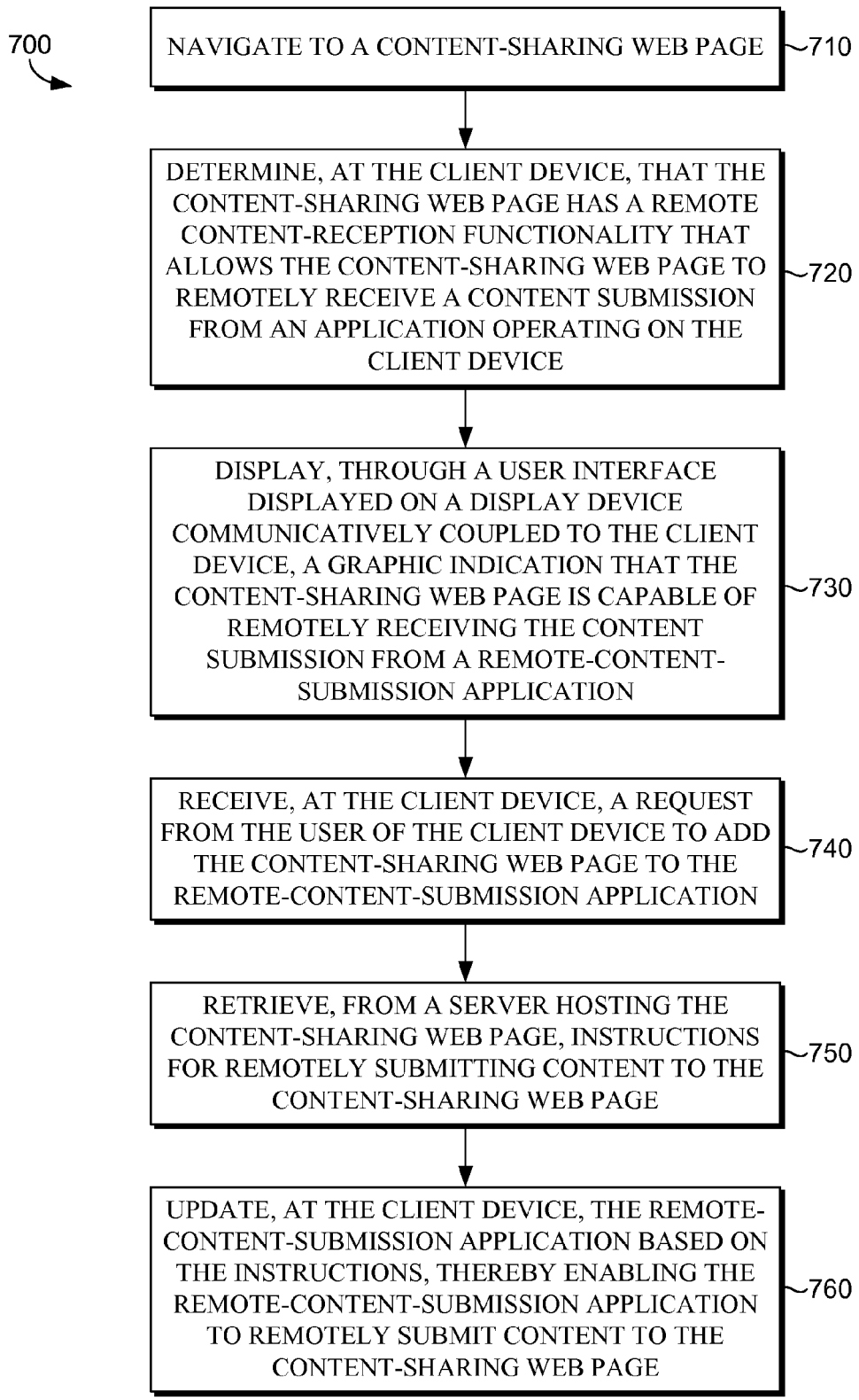
FIG. 7 is a flow chart showing a method of remotely submitting content to a content-sharing website, in accordance with an embodiment of the present invention.

Turning now to FIG. 7, a method 700 of remotely submitting content to a content-sharing website is provided, in accordance with an embodiment of the present invention. As described previously, the content-sharing website receives content submissions from users and displays the submitted content on the website. The submitted content may be ranked by popularity as determined by the number of times the content is submitted by multiple users or by some other method. Examples of content-sharing websites include Digg.com, StumbleUpon.com, Del.icio.us.com, NewsVine.com, Full.com, Slashdot.com, MrWong.com, Reddit.com, Ma.gnolia.com, and many others. At step 710, a client device is directed to navigate to the content-sharing website. Navigating to the content-sharing website may be accomplished by typing the URL associated with the content-sharing website into the navigation pane of a web browser. Embodiments of the present invention are not limited to use with a web browser. Other client applications that interact with media such as videos, songs, and pictures may be used in association with embodiments of the present invention. Suitable client applications include media players and graphics programs, in addition to web browsers. Upon navigating to the content-sharing website, the content-sharing website will be displayed in part or in full by the client application. In embodiments of the present invention, the client application may be operating on a client device, such as client device 202, that is communicatively coupled to a display device, such as a computer monitor. The content-sharing website may be hosted by a web server, such as content-sharing server 206, that is communicatively coupled to the client device through a network, such as the Internet.

At step 720, the client device determines that the content-sharing website has a remote content-reception functionality that allows the content-sharing website to remotely receive a content submission from an application operating on the client device. This determination may be made by identifying an attribute value or other metadata that is part of the content-sharing website. The data that identifies the content-sharing website as having remote content-reception functionality may be part of the website's code. As described previously, a remote content-reception functionality allows the content-sharing website to receive content from a client application that has not navigated to the content-sharing website.

At step 730, a graphic indication that the content-sharing website is capable of remotely receiving the content submission from a remote-content-submission application is displayed through the graphical user interface on a display device. In one embodiment, the indication is displayed as part of the user interface that is displaying the content-sharing website. For example, the indication can be part of a toolbar or other interface component on a browser that is displaying the website. The indication communicates to the user that the content-sharing website may be added to the group of content-sharing websites to which a content submission may be remotely sent by the client application. The remote-content-submission application on the client device may be a plug-in to a client application. For example, the remote-content-submission application may be part of a toolbar or a component of the application. However, embodiments of the present invention are not limited to a remote-content-submission application that is integrated with a separate program. The remote-content-submission application could be a stand-alone program that is executed apart from the client application that is interacting directly with the content-sharing website.

At step 740, a request is received from the user of the client device to add the content-sharing website to the remote-content-submission application. As described previously, adding the content-sharing website to the remote-content-submission application allows the remote-content-submission application to remotely submit content to the content-sharing website. Upon receiving the request from the user, the client application may send a request to the content-sharing website for instructions. At step 750, instructions are retrieved from a server hosting the content-sharing website. The instructions are for remotely submitting content to the specific content-sharing website. In one embodiment, the instructions are retrieved by generating an HTTP Get request and are received in an HTTP OK response. In one embodiment, the instructions are retrieved by navigating to a directory indicated in the initial download of the website. The instructions may be in the form of an XML code. The instructions will designate a URL to which a content submission should be sent. Instructions may also specify a template for submitting the URL of the content and a description of the content. In addition, a template for submitting authentication information may also be provided. For example, the instructions may instruct the client application to pass a cookie with user identification information as part of the content submission. Other authentication methods have been described previously with reference to FIG. 3.

At step 760, the remote-content-submission application is updated based on the instructions. Once updated, the remote-content-submission application is able to remotely submit content to the content-sharing website. Content may be submitted upon receiving a request to submit content from the user. For example, the user could instruct the client application to navigate to a website displaying content. The user could then select content and one or more share sites to which the content should be sent. Upon receiving a selection of content and share sites, the client application, in association with the remote-content-submission application, generates content submissions that are specific to the instructions provided by each of the plurality of share sites. Once generated, the content submissions are transmitted to the share sites, which then take steps to add the content to their websites.

Figure 8:
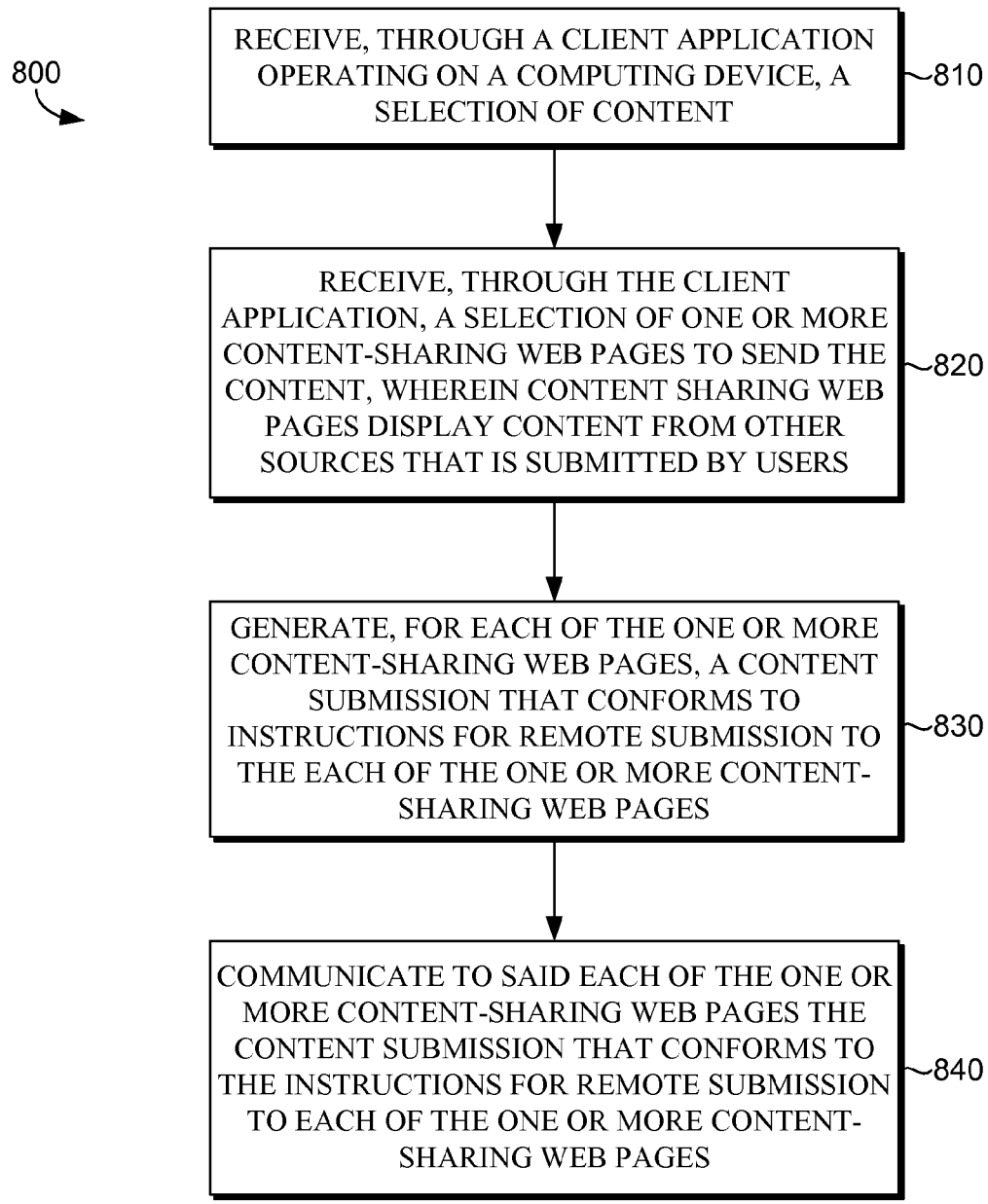
FIG. 8 is a flow chart showing a method of remotely submitting content to a content-sharing website through a client application, in accordance with an embodiment of the present invention.

Turning now to FIG. 8, a method 800 of remotely submitting content to a content-sharing website through a client application is provided, in accordance with an embodiment of the present invention. At step 810, a selection of content is received through a client application operating on a computing device. The computing device may be similar to client device 202 described previously with reference to FIG. 2. The content may be a website, a portion of a website, a video, a song, a picture, or other content. The user may select the content by highlighting the content and pushing a selection button. In another embodiment, the user may select an entire website by navigating to the website and pushing a selection button.

At step 820, a selection of one or more content-sharing websites is received. The selection designates the one or more content-sharing websites to which a content submission should be sent. The content-sharing websites may have been made available for selection by downloading remote submission instructions from the website, as previously described. In another embodiment, the client application may have preprogrammed submission options. The user may select the one or more content-sharing websites by activating a dropdown menu or other interface showing the selection of content-sharing websites. A user may select one, two or more out of a plurality of available content-sharing websites. In another embodiment, the user designates a default content-sharing website or multiple default content-sharing websites that are automatically invoked when content is selected for submission.

At step 830, a content submission that conforms to instructions for remote submission to each of the one or more content-sharing websites is generated. An individual content-submission package is generated for each of the one or more content-sharing websites. Each content-sharing website may follow a different submission format and is likely to have a different URL to which the content submission is communicated.

At step 840, the content submission package is communicated to each of the one or more content-sharing websites that were initially selected. As described previously, each content submission conforms to the instructions for remote submission to each of the one or more content-sharing websites. The content submission may be communicated over the Internet as part of an HTTP request or by following another communication method. In one embodiment, the websites to which the content submission is sent may send a confirmation that the content submission is received and accepted. In one embodiment, the response directs the client application to a confirmation website communicating to the user that the content has been submitted. In another embodiment, the content-sharing website directs the user to a confirmation page that displays the submitted content and asks the user to confirm that they wish to submit the content. The user may then send a confirmation to the website. Embodiments of the present invention do not require such confirmations. In another embodiment, authentication information is required on behalf of the user in order to submit content. The authentication information may be sent as part of the initial content submission as a cookie or token containing authentication information. In another embodiment, the user is directed to a website where they may enter the authentication information before the content is accepted.

Figure 9:
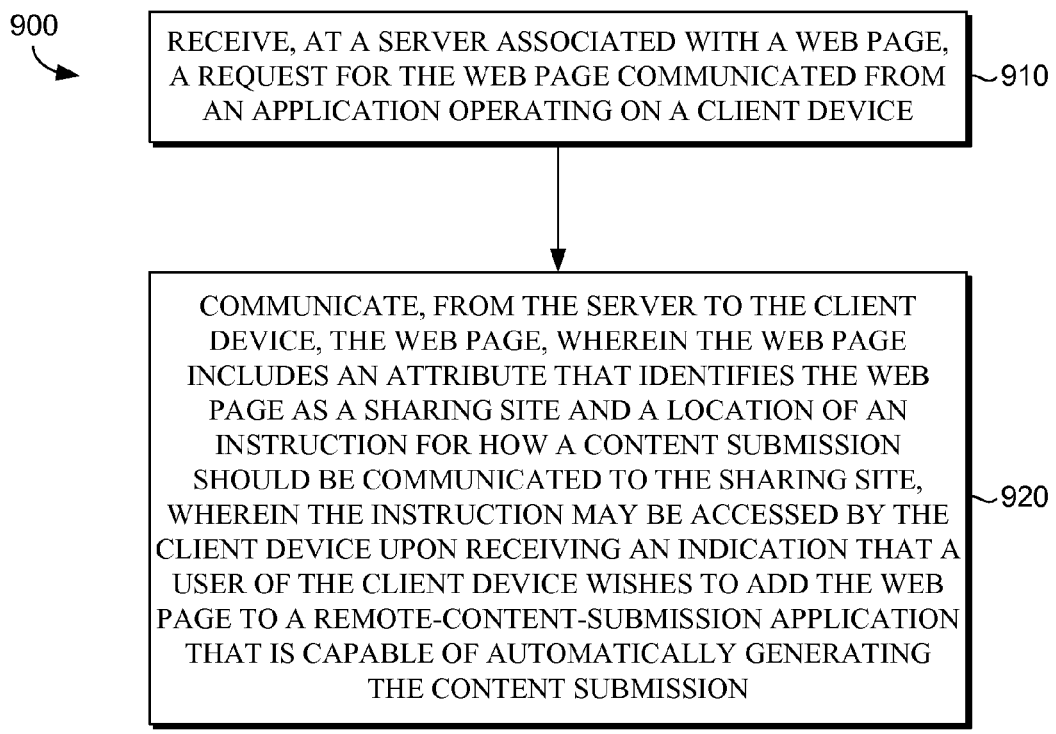
FIG. 9 is a flow chart showing a method of instructing a client device to automatically submit content to a sharing site, in accordance with an embodiment of the present invention.

Turning now to FIG. 9, a method 900 of instructing a client device to automatically submit content to a content-sharing site is provided in accordance with an embodiment of the present invention. The method 900 may be performed by a content-sharing website that wishes to enable client applications to remotely submit content to the content-sharing website. At step 910, a request for the website communicated from an application operating on a client device is received. The request is received at a server associated with the website. The request may be a simple HTTP Get request for the website. At step 920, the website is communicated from the server to the client device in response to the request. The communicated website includes an attribute that identifies the website as a sharing site and a location of instructions for how a content submission should be communicated to the sharing site. The location may be a directory where XML instructions may be retrieved. The instruction may be accessed by the client device upon receiving an indication that the user of the client device wishes to add the website to a remote-content-submission application that is capable of automatically generating the content submission on behalf of the user.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of remotely submitting content to a content-sharing website through a client application, the method comprising:
   receiving, through the client application operating on a computing device, a selection of content;
   receiving, through the client application, a selection of one or more content-sharing websites to send a content, wherein code of the one or more content-sharing website includes an attribute that identifies the one or more content-sharing websites as within a content-sharing-website category of websites and a location of instructions for how a content. submission should be communicated to the one or more content-sharing website;
   generating, for each of the one or more content-sharing websites, a content submission that conforms to the instructions for remote submission to said each of the one or more content-sharing websites; and
   communicating to said each of the one or more content-sharing websites the content submission that conforms to the instructions for remote submission of each of the one or more content-sharing websites.

2. The method of claim 1, wherein the content includes one or more of a blog entry, a website, a song, and a video.

3. The method of claim 1, wherein the method further includes causing display of a website indicating the content submission has been received at least one of the one or more content-sharing websites.

4. The method of claim 1, wherein the method further includes causing display of, to a user that selected the content, a website that displays the content submission and asks the user to confirm that the content submission should be communicated to the one or more content-sharing websites; and receiving a confirmation that the content submission should be communicated.

5. The method of claim 1, wherein the instructions include a template for communicating the content submission to the content-sharing website.

6. The method of claim 5, wherein the template includes an attribute for a URL of the content-sharing website, an attribute for a title of the content, and an attribute for a URL for the content.

7. One or more hardware computer-readable memory having computer-executable instructions embodied thereon for performing a method of instructing a client device to automatically submit content to a content-sharing website, the method comprising:

receiving, at a server associated with a website, a request for the website, wherein the request is communicated from a client application operating on the client device, and wherein the website is the content-sharing web site; and communicating, from the server to the client device, the website, wherein code of the content-sharing website includes an attribute that identifies the website as within a content-sharing-website category of websites and a location of an instruction for how a content submission should be communicated to the website, wherein the instruction is accessed by the client device upon receiving an indication that a user of the client device wishes to add the website to a remote-content-submission capability of the client application, and wherein the remote-content-submission capability automatically generates the content submission.

8. The memory of claim 7, wherein the instruction includes an authentication instruction for authenticating the content submission to the website from the client device.

9. The memory of claim 8, wherein the authentication instruction indicates one or more of that a cookie including user credentials needs to be passed to the server with the content submission, that a basic HTTP authentication process needs to be completed, and that a user identification information should be submitted with the content submission.

10. The memory of claim 9, wherein the method further includes receiving, at the server from the client device, the content submission that conforms to the instruction and the authentication instruction.

11. The memory of claim 10, wherein the content submission includes a uniform resource locator for the content and a written description of the content.

12. The memory of claim 7, wherein the instruction includes a template for communicating the content submission to the website.

13. The memory of claim 12, wherein the template includes an attribute for a URL of the website, an attribute for a title of the content, and an attribute for a URL for the content.

14. A system for remotely submitting content to a content-sharing website, the system comprising:

a client device configured for:

determining that the content-sharing web site has a remote content-reception functionality that allows the content-sharing website to remotely receive a content submission from an application operating on the client device; and a content-sharing server configured for:

communicating to the client device, a website associated with the content-sharing server, wherein code of the website includes an attribute that identifies the website as within a content-sharing-website category of websites and a location of an instruction for how the content submission should be communicated to the website, wherein the instruction may be accessed by the client device upon receiving an indication that a user of the client device wishes to add the website to a remote-content-submission capability of a client application, and wherein the remote-content-submission capability automatically generates the content submission.

15. The system of claim 14 wherein the client device is further configured for:

displaying through a graphic interface displayed on a display device communicatively coupled to the client device, a graphic indication that the content-sharing website is capable of remotely receiving the content submission for a remote-content-submission application on the client device that automatically submits the content to the content-sharing website upon receiving a request from the user of the client device to generate the content submission;

receiving, at the client device the request from the user of the client device to add the content-sharing website to the remote-content-submission application;

retrieving, from the location, instructions for remotely submitting the content to the content-sharing website.

16. The system of claim 15 wherein the client device is further configured for:

updating the remote-content-submission application based on the instructions, thereby enabling the remote-content-submission application to remotely submit the content to the content-sharing website.

17. The system of claim 14 wherein the client device is further configured for:

generating for the website of the content-sharing server, the content submission that conforms to instructions for remote submission to the website of the content-sharing server, wherein the instructions are provided to the client application as a portion of code of the website.

18. The system of claim 14 wherein the content-sharing server is configured for:

receiving the content submission that conforms to the instructions for remote submission of the content-sharing server, wherein the content-sharing server is one of a plurality of content sharing servers associated with the remote-content-submission capability of the client application.

19. The system of claim 18 wherein the content-sharing server is further configured for:

providing for display the content submission that conforms to the instructions of the content-sharing server, wherein the content submission is submitted by users.

20. The system of claim 14 further comprising:

a content server configured for:

providing a selection of content, wherein the content includes one or more of blog entry, a website, a song, and a video.

* * * * *